(12) United States Patent
Kim et al.

(10) Patent No.: US 12,519,307 B2
(45) Date of Patent: Jan. 6, 2026

(54) ELECTROSTATIC DISCHARGE CLAMP CIRCUIT

(71) Applicant: SAMSUNG ELECTRONICS CO., LTD., Suwon-si (KR)

(72) Inventors: Sukjin Kim, Suwon-si (KR); Sangyoung Cho, Suwon-si (KR); Eonguk Kim, Suwon-si (KR); Chanhee Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 18/227,599

(22) Filed: Jul. 28, 2023

(65) Prior Publication Data

US 2024/0136813 A1 Apr. 25, 2024
US 2024/0235189 A9 Jul. 11, 2024

(30) Foreign Application Priority Data

Oct. 19, 2022 (KR) .................. 10-2022-0135217
Feb. 1, 2023 (KR) .................. 10-2023-0013611

(51) Int. Cl.
*H02H 9/04* (2006.01)
(52) U.S. Cl.
CPC .................. *H02H 9/046* (2013.01)
(58) Field of Classification Search
CPC .................. H02H 9/046; H10D 89/811
USPC .................................... 361/56
See application file for complete search history.

(56) References Cited

U.S. PATENT DOCUMENTS

| | | | |
|---|---|---|---|
| 6,972,939 B1* | 12/2005 | Ho ................ | H10D 89/819 |
| | | | 361/111 |
| 7,804,669 B2* | 9/2010 | Worley ........... | H10D 89/811 |
| | | | 361/111 |
| 7,881,028 B2 | 2/2011 | Abou-Khalil et al. | |
| 8,760,828 B2 | 6/2014 | Ma | |
| 8,830,641 B2* | 9/2014 | Van Der Borght | H02H 9/046 |
| | | | 361/118 |
| 9,013,843 B2* | 4/2015 | Chen .............. | H02H 9/046 |
| | | | 361/118 |
| 9,058,886 B2* | 6/2015 | Miyakawa ....... | G11C 5/147 |
| 9,356,442 B2 | 5/2016 | Cai et al. | |
| 10,177,137 B1* | 1/2019 | Altolaguirre ..... | H10D 89/817 |

(Continued)

FOREIGN PATENT DOCUMENTS

| | | | | |
|---|---|---|---|---|
| CN | 101902039 A | * | 12/2010 | ....... H02H 9/046 |
| CN | 107425514 A | * | 12/2017 | ....... H02H 9/045 |

(Continued)

*Primary Examiner* — Dharti H Patel
(74) *Attorney, Agent, or Firm* — Sughrue Mion, PLLC

(57) ABSTRACT

An electrostatic discharge clamp circuit includes a resistor connected between a first node and a second node, a first capacitor connected between the second node and a third node, a second capacitor connected between a fourth node and the third node, a third capacitor connected between a fifth node and the third node, a first inverter providing a power supply voltage or a voltage of the fourth node based on a voltage of the second node, a second inverter providing an output voltage of the first inverter or a voltage of the fifth node based on the voltage of the fourth node, a third inverter configured to provide an output voltage of the second inverter or the ground voltage based on the voltage of the fifth node.

19 Claims, 12 Drawing Sheets

(56) References Cited

U.S. PATENT DOCUMENTS

| | | | | |
|---|---|---|---|---|
| 10,790,277 B2* | 9/2020 | Maeda | | H10D 89/911 |
| 10,886,729 B2* | 1/2021 | Chen | | H10D 84/811 |
| 11,146,060 B2* | 10/2021 | Hsu | | H02H 1/0007 |
| 11,916,376 B2* | 2/2024 | Chen | | H10D 89/819 |
| 2003/0202299 A1* | 10/2003 | Maloney | | H02H 9/046 |
| | | | | 361/56 |
| 2005/0078419 A1 | 4/2005 | Stockinger et al. | | |
| 2005/0275989 A1* | 12/2005 | Chen | | H10D 89/811 |
| | | | | 361/93.1 |
| 2006/0203405 A1* | 9/2006 | Bhattacharya | | H10D 89/811 |
| | | | | 361/91.1 |
| 2006/0274466 A1* | 12/2006 | Rice | | H10D 89/811 |
| | | | | 361/56 |
| 2007/0053120 A1* | 3/2007 | Gauthier, Jr. | | H02H 9/046 |
| | | | | 361/56 |
| 2007/0076338 A1* | 4/2007 | Traynor | | H10D 89/819 |
| | | | | 361/56 |
| 2007/0109697 A1 | 5/2007 | Huh | | |
| 2013/0182359 A1* | 7/2013 | Jeon | | H02H 9/044 |
| | | | | 361/56 |
| 2013/0229736 A1* | 9/2013 | Van Der Borght | | H02H 9/044 |
| | | | | 361/56 |
| 2014/0063665 A1* | 3/2014 | Chen | | H02H 9/041 |
| | | | | 361/56 |
| 2015/0288173 A1* | 10/2015 | Chen | | H02H 9/046 |
| | | | | 361/56 |
| 2015/0318275 A1* | 11/2015 | Chen | | H10D 89/811 |
| | | | | 361/56 |
| 2018/0026440 A1* | 1/2018 | Zhao | | H10D 89/819 |
| | | | | 361/56 |
| 2018/0351352 A1* | 12/2018 | Chen | | H10D 89/819 |
| 2019/0097420 A1* | 3/2019 | Chen | | H10D 89/819 |
| 2022/0352709 A1* | 11/2022 | Fan | | H02H 9/046 |
| 2022/0352711 A1* | 11/2022 | Chen | | H02H 9/046 |
| 2024/0235189 A9* | 7/2024 | Kim | | H02H 9/046 |
| 2024/0332959 A1* | 10/2024 | Li | | G11C 7/24 |

FOREIGN PATENT DOCUMENTS

| | | | | |
|---|---|---|---|---|
| CN | 207184049 U | * | 4/2018 | |
| CN | 106410773 B | * | 9/2018 | ............. H02H 9/047 |
| CN | 115274649 A | * | 11/2022 | ....... H03K 19/00315 |
| KR | 10-0795472 B1 | | 1/2008 | |
| KR | 10-1110942 B1 | | 3/2012 | |

* cited by examiner

ELECTROSTATIC DISCHARGE CLAMP CIRCUIT

CROSS-REFERENCE TO RELATED APPLICATIONS

This application claims priority to Korean Patent Application Nos. 10-2022-0135217 filed on Oct. 19, 2022, and 10-2023-0013611 filed on Feb. 1, 2023, in the Korean Intellectual Property Office, the disclosures of which are incorporated by reference herein in their entireties.

BACKGROUND

The present disclosure relates to an electrostatic discharge clamp circuit, and more particularly, relate to an electrostatic discharge clamp circuit including clamping transistors of a multi-stage (or multi-stack) structure.

An electrostatic discharge protection device may be classified as a silicon controlled rectifier (SCR) (or thyristor)-based electrostatic discharge protection device or a field effect transistor (FET)-based electrostatic discharge protection device.

The thyristor-based electrostatic discharge protection device may use a parasitic bipolar junction transistor (BJT) component, and a snap-back phenomenon occurs in a circuit. In contrast, the FET-based electrostatic discharge protection device does not use a parasitic BJT component and discharges an ESD current through a channel formed by the turn-on of the FET. In particular, because the FET-based electrostatic discharge protection device directly uses the turn-on and the turn-off of the FET to discharge the ESD current, it is possible to design the electrostatic discharge protection device by using low-voltage FETs. As such, the FET-based electrostatic discharge protection device may be applied to a low-power element/device (e.g., an application processor).

Due to the characteristic of the low-voltage FET, the low-voltage FET may be very vulnerable to an external voltage exceeding an allowable voltage. Accordingly, it is very important to design an electrostatic discharge protection device capable of protecting a device from an external voltage exceeding the allowable voltage of the FET of the electrostatic discharge protection device.

SUMMARY

One or more embodiments provide an electrostatic discharge clamp circuit capable of protecting an electronic device by using low-voltage FETs.

According to an aspect of an embodiment, an electrostatic discharge clamp circuit includes a resistor connected between a first node to which a power supply voltage is provided and a second node; a first capacitor connected between the second node and a third node to which a ground voltage is provided; a second capacitor connected between a fourth node and the third node to which the ground voltage is provided; a third capacitor connected between a fifth node and the third node to which the ground voltage is provided; a first inverter configured to provide the power supply voltage or a voltage of the fourth node based on a voltage of the second node; a second inverter configured to provide an output voltage of the first inverter or a voltage of the fifth node based on the voltage of the fourth node; a third inverter configured to provide an output voltage of the second inverter or the ground voltage based on the voltage of the fifth node; and a first clamping transistor, a second clamping transistor, and a third clamping transistor connected in series between the first node to which the power supply voltage is provided and the third node to which the ground voltage is provided, wherein the first clamping transistor is configured to operate based on the output voltage of the first inverter, the second clamping transistor is configured to operate based on the output voltage of the second inverter, and the third clamping transistor is configured to operate based on an output voltage of the third inverter.

According to an aspect of an embodiment, an electrostatic discharge clamp circuit includes a resistor connected between a first node to which a power supply voltage is provided and a second node; a first capacitor connected between the second node and a third node to which a ground voltage is provided; a second capacitor connected between a fourth node and the third node to which the ground voltage is provided; a first inverter configured to provide the power supply voltage or a voltage of the fourth node based on a voltage of the second node; a second inverter configured to provide an output voltage of the first inverter or the ground voltage based on the voltage of the fourth node; and a first clamping transistor and a second clamping transistor connected in series between the first node to which the power supply voltage is provided and the third node to which the ground voltage is provided, wherein the first clamping transistor is configured to operate based on the output voltage of the first inverter, and the second clamping transistor is configured to operate based on an output voltage of the second inverter.

According to an aspect of an embodiment, an electrostatic discharge clamp circuit includes a resistor and a first capacitor connected in series between a first node to which a power supply voltage is provided and a second node to which a ground voltage is provided; a first PMOS transistor and a first NMOS transistor connected between the first node to which the power supply voltage is provided and a third node, and configured to operate based on a voltage of a fourth node between the resistor and the first capacitor; a second capacitor connected between the third node and the second node to which the ground voltage is provided; a second PMOS transistor and a second NMOS transistor connected between a fifth node between the first PMOS transistor and the first NMOS transistor and a sixth node, and configured to operate based on a voltage of the third node; a third capacitor connected between the sixth node and the second node to which the ground voltage is provided; a third PMOS transistor and a third NMOS transistor connected between a seventh node between the second PMOS transistor and the second NMOS transistor and the second node to which the ground voltage is provided, and configured to operate based on a voltage of the sixth node; and a first clamping transistor, a second clamping transistor, and a third clamping transistor connected in series between the first node to which the power supply voltage is provided and the second node to which the ground voltage is provided, wherein a gate electrode of the first clamping transistor is connected to the fifth node between the first PMOS transistor and the first NMOS transistor, a gate electrode of the second clamping transistor is connected to the seventh node between the second PMOS transistor and the second NMOS transistor, and a gate electrode of the third clamping transistor is connected to an eighth node between the third PMOS transistor and the third NMOS transistor.

BRIEF DESCRIPTION OF THE FIGURES

The above and other objects and features of the present disclosure will become apparent by describing in detail embodiments thereof with reference to the accompanying drawings, in which.

DETAILED DESCRIPTION

One or more embodiments are described in detail below.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
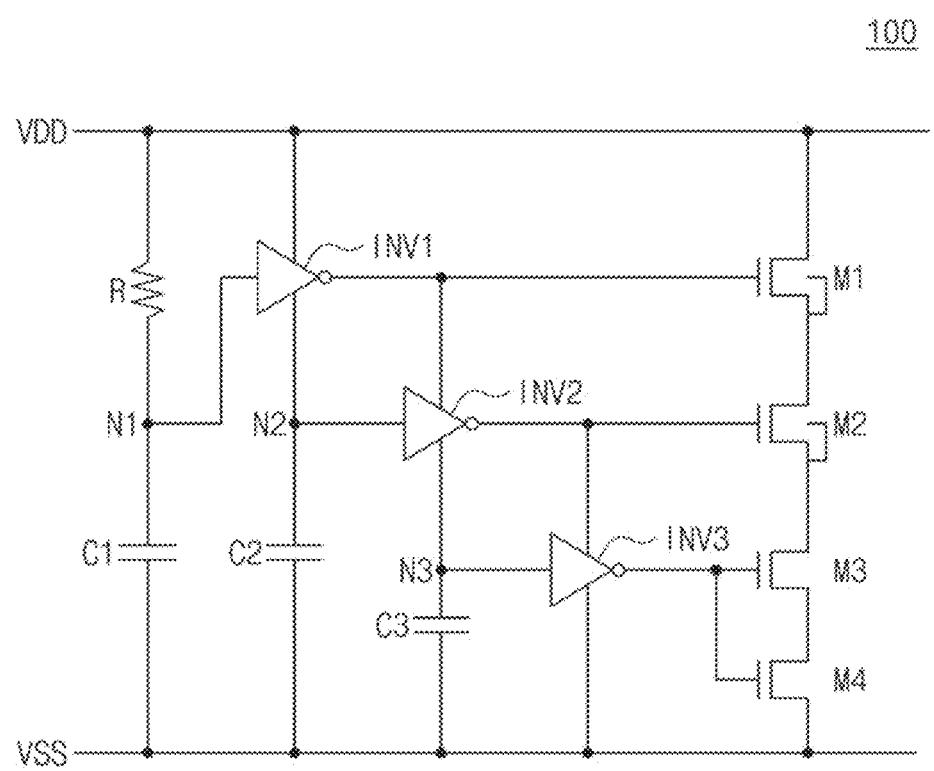
FIG. 1 is a diagram illustrating a configuration of an electrostatic discharge (ESD) clamp circuit, according to an embodiment of the present disclosure.

FIG. 1 is a diagram illustrating a configuration of an electrostatic discharge clamp circuit (hereinafter referred to as an "ESD clamp circuit") 100, according to an embodiment of the present disclosure.

The ESD clamp circuit 100 may include a resistor "R", a first capacitor C1, a second capacitor C2, a third capacitor C3, a first inverter INV1, a second inverter INV2, a third inverter INV3, a first clamping transistor M1, a second clamping transistor M2, a third clamping transistor M3, and a fourth clamping transistor M4. Herein, the first capacitor C1, the second capacitor C2, and the third capacitor C3 may be actual capacitors, not parasitic capacitance components coming from the structure/configuration of transistors constituting the ESD clamp circuit 100.

The resistor "R" may be connected between a node to which a power supply voltage VDD is provided and a first node N1, and the first capacitor C1 may be connected between a node to which a ground voltage VSS is provided and the first node N1. The second capacitor C2 may be connected between the node to which the ground voltage VSS is provided and a second node N2, and the third capacitor C3 may be connected between the node to which the ground voltage VSS is provided and a third node N3.

The first inverter INV1 may operate based on the power supply voltage VDD and the voltage of the second node N2. The first inverter INV1 may operate in response to the voltage of the first node N1. For example, the first inverter INV1 may output the power supply voltage VDD or the voltage of the second node N2 in response to the voltage of the first node N1. As in the above description, the second inverter INV2 may output the output voltage of the first inverter INV1 or the voltage of the third node N3 in response to the voltage of the second node N2, and the third inverter INV3 may output the output voltage of the second inverter INV2 or the ground voltage VSS in response to the voltage of the third node N3.

In an embodiment, each of the first inverter INV1 to the third inverter INV3 may be a CMOS-based inverter. That is, each of the first inverter INV1 to the third inverter INV3 may include at least one PMOS transistor and at least one NMOS transistors that are connected in series.

The clamping transistors M1 to M4 may be connected in series between the node to which the power supply voltage VDD is provided and the node to which the ground voltage VSS is provided. The first clamping transistor M1 may operate in response to the output voltage of the first inverter INV1, and the second clamping transistor M2 may operate in response to the output voltage of the second inverter INV2. The clamping transistors M3 and M4 may operate in response to the output voltage of the third inverter INV3.

In an embodiment, each of the clamping transistors M1 to M4 may be an NMOS transistor. Each of the clamping transistors M1 and M2 may be a transistor formed on at least two or more wells, and each of the clamping transistors M3 and M4 may be a transistor formed in a substrate. Accordingly, the clamping transistors M1 and M2 may tolerate a current leakage better than the clamping transistors M3 and M4. Meanwhile, an embodiment in which two transistors (i.e., M3 and M4) operate in response to the output voltage of the third inverter INV3 is illustrated in FIG. 1, but the present disclosure is not limited thereto. That is, in various embodiments, the number of transistors operating in response to the output voltage of the third inverter INV3 may be 1 or may be 3 or more.

Figure 2:
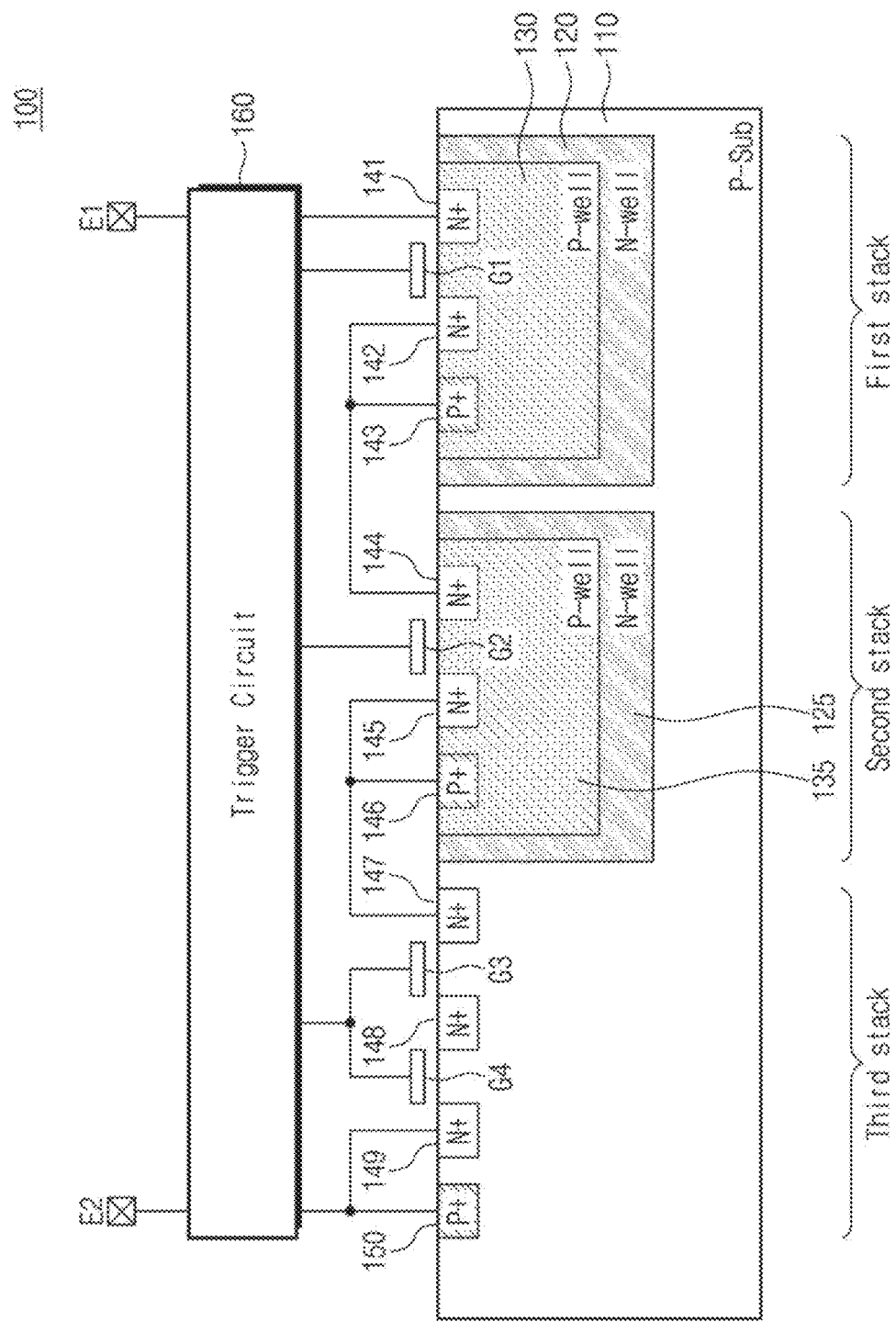
FIG. 2 is a cross-sectional view of an ESD clamp circuit of FIG. 1, according to an embodiment of the present disclosure.

FIG. 2 is a cross-sectional view of the ESD clamp circuit 100 of FIG. 1. For brevity of illustration, the cross-sectional view of some transistors M1 to M4 among all the components of the ESD clamp circuit 100 is illustrated.

The ESD clamp circuit 100 may include a substrate 110, a first N-well 120, a second N-well 125, a first P-well 130, a second P-well 135, diffusion regions 141, 142, and 143, diffusion regions 144, 145, and 146, diffusion regions 147, 148, 149, and 150, gate electrodes G1, G2, G3, and G4, and a trigger circuit 160. The trigger circuit 160 may include the resistor "R", the first capacitor C1, the second capacitor C2, the third capacitor C3, the first inverter INV1, the second inverter INV2, and the third inverter INV3 of FIG. 1.

The substrate 110 may be doped with P-type impurities (i.e., dopant) of a low concentration. Alternatively, the substrate 110 may be a P-type epitaxial layer of a low concentration.

The first N-well 120 and the second N-well 125 may be formed on the substrate 110. The first N-well 120 and the second N-well 125 may be doped with N-type impurities of a low concentration. For example, the doping concentration of the first N-well 120 and the second N-well 125 may be equal to the doping concentration of the substrate 110 or may be higher than the doping concentration of the substrate 110.

The first P-well 130 may be formed on (or in) the first N-well 120, and the second P-well 135 may be formed on (or in) the second N-well 125. This structure may be called a double well structure. That is, the first N-well 120 and the second N-well 125 may be deep N-wells, and the first P-well 130 and the second P-well 135 may be shallow P-wells. The first P-well 130 and the second P-well 135 may be doped with P-type impurities of a low concentration. For example, the doping concentration of the first P-well 130 and the second P-well 135 may be equal to the doping concentration of the first N-well 120 and the second N-well 125 or may be higher than the doping concentration of the first N-well 120 and the second N-well 125.

The first diffusion region 141, the second diffusion region 142, and the third diffusion region 143 may be formed on the first P-well 130. The first diffusion region 141 and the second diffusion region 142 may be doped with N-type impurities to have an N-type conductivity, and the third diffusion region 143 may be doped with P-type impurities to have a P-type conductivity. For example, the doping concentration of the first diffusion region 141, the second diffusion region 142, and the third diffusion region 143 may be higher than the doping concentration of the first P-well 130.

The fourth diffusion region 144, the fifth diffusion region 145, and the sixth diffusion region 146 may be formed on the second P-well 135. The fourth diffusion region 144 and the fifth diffusion region 145 may be doped with N-type impurities to have an N-type conductivity, and the sixth diffusion region 146 may be doped with P-type impurities to have a P-type conductivity. For example, the doping concentration of the fourth diffusion region 144, the fifth diffusion region 145, and the sixth diffusion region 146 may be higher than the doping concentration of the second P-well 135.

The seventh diffusion region 147, the eighth diffusion region 148, the ninth diffusion region 149, and the tenth diffusion region 150 may be formed on the substrate 110. The seventh diffusion region 147, the eighth diffusion region 148, and the ninth diffusion region 149 may be doped with N-type impurities to have an N-type conductivity, and the tenth diffusion region 150 may be doped with P-type impurities to have a P-type conductivity. For example, the doping concentration of the seventh diffusion region 147 to the tenth diffusion region 150 may be higher than the doping concentration of the substrate 110.

The first gate electrode G1 may be formed on the first P-well 130 between the first diffusion region 141 and the second diffusion region 142. The second gate electrode G2 may be formed on the second P-well 135 between the fourth diffusion region 144 and the fifth diffusion region 145. The third gate electrode G3 may be formed on the substrate 110 between the seventh diffusion region 147 and the eighth diffusion region 148, and the fourth gate electrode G4 may be formed on the substrate 110 between the eighth diffusion region 148 and the ninth diffusion region 149. For example, the first gate electrode G1, the second gate electrode G2, the third gate electrode G3, and the fourth gate electrode G4 may be formed of polysilicon.

The second diffusion region 142, the third diffusion region 143, and the fourth diffusion region 144 may be electrically connected to each other through a metal interconnection. The fifth diffusion region 145, the sixth diffusion region 146, and the seventh diffusion region 147 may be electrically connected to each other through a metal interconnection.

The first diffusion region 141 may be connected to a first electrode E1 through a metal interconnection and/or a via, and the ninth diffusion region 149 and the tenth diffusion region 150 may be connected to a second electrode E2 through a metal interconnection and/or a via. For example, the first electrode E1 may be an anode electrode receiving an ESD voltage (or current), and the second electrode E2 may be a cathode electrode to which a ground voltage is provided.

For example, the first diffusion region 141, the second diffusion region 142, and the first gate G1 formed on the first P-well 130 may constitute the first clamping transistor M1 (see, e.g., FIG. 1). The fourth diffusion region 144, the fifth diffusion region 145, and the second gate G2 formed on the second P-well 135 may constitute the second clamping transistor M2 (see, e.g., FIG. 1). The seventh diffusion region 147, the eighth diffusion region 148, and the third gate electrode G3 formed on the substrate 110 may constitute the third clamping transistor M3 (see, e.g., FIG. 1), and the eighth diffusion region 148, the ninth diffusion region 149, and the fourth gate electrode G4 formed on the substrate 110 may constitute the fourth clamping transistor M4 (see, e.g., FIG. 1).

In an embodiment, the first clamping transistor M1 may be turned on depending on the operation of the first inverter INV1 (see, e.g., FIG. 1), the second clamping transistor M2 may be turned on depending on the operation of the second inverter INV2 (see, e.g., FIG. 1), and the third clamping transistor M3 and the fourth clamping transistor M4 may be turned on depending on the operation of the third inverter INV3 (see, e.g., FIG. 1). In this regard, the first clamping transistor M1 may be called a first stack or a first stage. As in the above description, the second clamping transistor M2 may be called a second stack or a second stage, and the third clamping transistor M3 and the fourth clamping transistor M4 may be called a third stack or a third stage.

Figure 3:
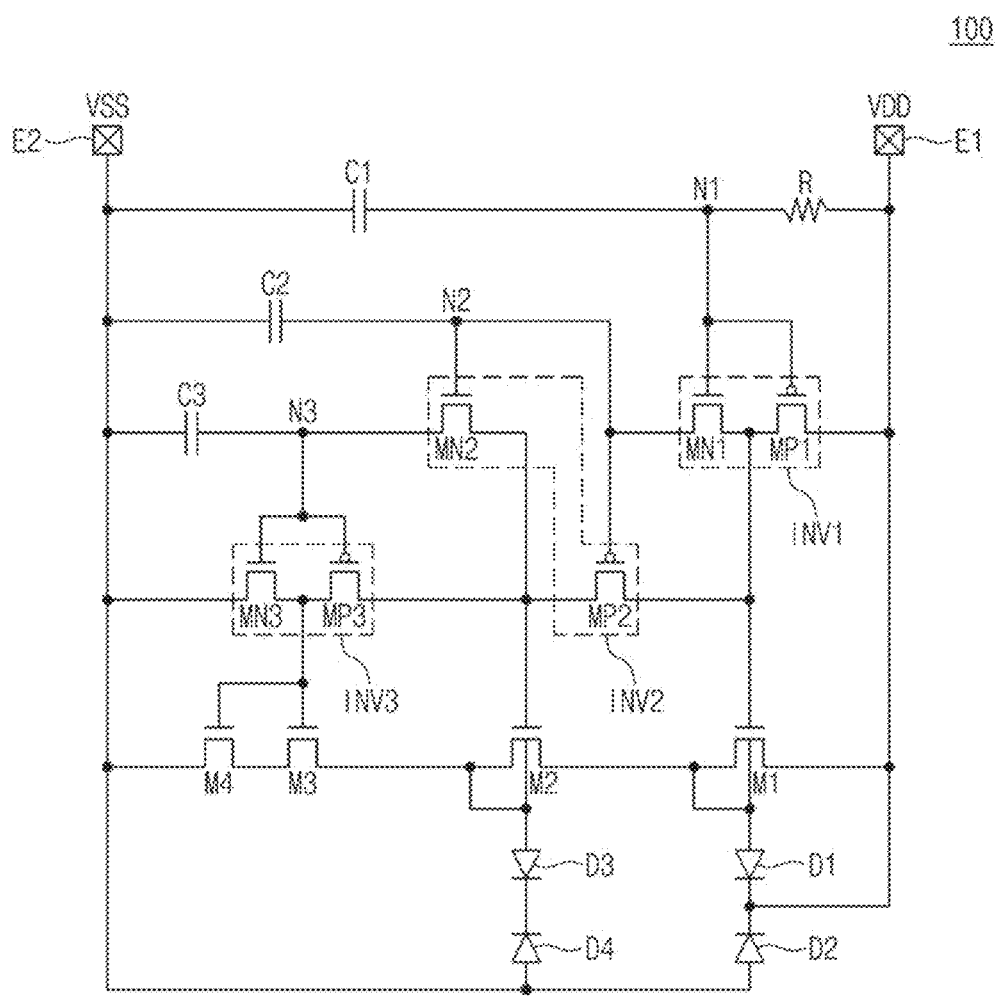
FIG. 3 is a diagram illustrating a configuration of an ESD clamp circuit of FIGS. 1 and 2, according to an embodiment of the present disclosure.

FIG. 3 is a diagram illustrating a configuration of the ESD clamp circuit 100 of FIGS. 1 and 2.

In an embodiment, each of the first inverter INV1, the second inverter INV2, and the third inverter INV3 may be a CMOS-based inverter. Accordingly, the first inverter INV1 may include a first PMOS transistor MP1 and a first NMOS transistor MN1. The gate electrode of the first PMOS transistor MP1 and the gate electrode of the first NMOS transistor MN1 may be connected to the first node N1, and the drain electrode of the first PMOS transistor MP1 and the drain electrode of the first NMOS transistor MN1 may be connected to the gate electrode of the first clamping transistor M1.

The second inverter INV2 may include a second PMOS transistor MP2 and a second NMOS transistor MN2. The gate electrode of the second PMOS transistor MP2 and the gate electrode of the second NMOS transistor MN2 may be connected to the second node N2, and the drain electrode of the second PMOS transistor MP2 and the drain electrode of the second NMOS transistor MN2 may be connected to the gate electrode of the second clamping transistor M2.

The third inverter INV3 may include a third PMOS transistor MP3 and a third NMOS transistor MN3. The gate electrode of the third PMOS transistor MP3 and the gate electrode of the third NMOS transistor MN3 may be connected to the third node N3, and the drain electrode of the third PMOS transistor MP3 and the drain electrode of the third NMOS transistor MN3 may be connected to the gate electrode of the third clamping transistor M3 and the fourth clamping transistor M4.

Meanwhile, due to the third diffusion region 143 formed on the first P-well 130, the body (i.e., 130) and the source electrode (i.e., 142) of the first clamping transistor M1 may be expressed as being connected to each other. The PN junction of the first P-well 130 and the first N-well 120 form a first diode D1, and the PN junction of the substrate 110 and the first N-well 120 forms a second diode D2. The first N-well 120 may be expressed as being connected to the first electrode E1 through a metal interconnection and/or a via.

As in the above description, due to the sixth diffusion region 146 formed on the second P-well 135, the body (i.e., 135) and the source electrode (i.e., 145) of the second clamping transistor M2 may be expressed as being connected to each other. The PN junction of the second P-well 135 and the second N-well 125 form a third diode D3, and the PN junction of the substrate 110 and the second N-well 125 forms a fourth diode D4.

Figure 4:
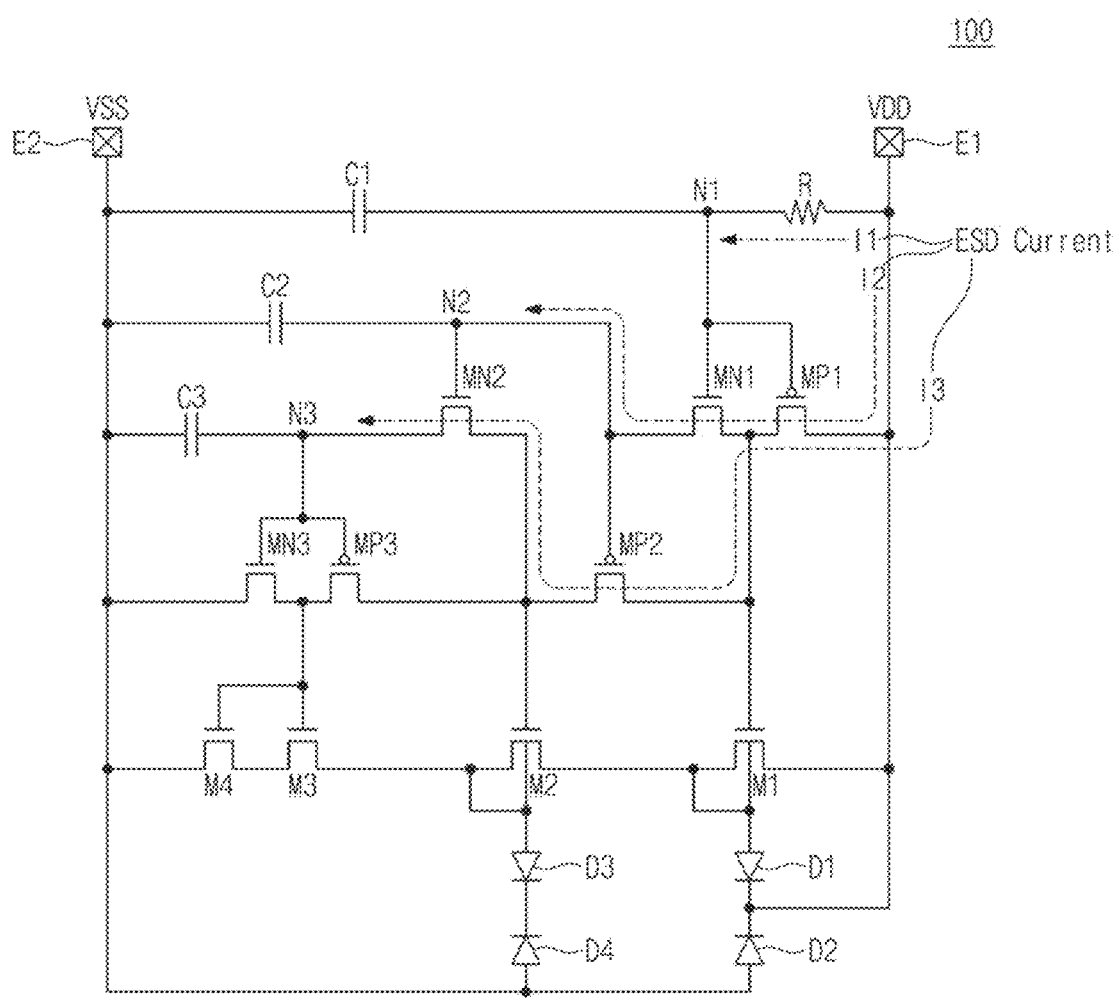
FIG. 4 is a circuit diagram illustrating an operation of an ESD clamp circuit of FIG. 3, according to an embodiment of the present disclosure.

FIG. 4 is a circuit diagram illustrating an operation of the ESD clamp circuit 100 of FIG. 3.

When the ESD event occurs, the ESD current (or voltage) may be introduced through the first electrode E1. In this case, a first current I1 may flow to the resistor "R". A portion of the first current I1 may flow to the first capacitor C1, and the remaining portion thereof may flow to the gate electrode of the first NMOS transistor MN1. In this case, the first NMOS transistor MN1 may be turned on. However, in some cases, the magnitude of the first current I1 may not be great enough to turn on the first NMOS transistor MN1.

A second current I2 being a portion of the ESD current may be a leakage current flowing through the first PMOS transistor MP1 of a turn-off state and the first NMOS transistor MN1 of a turn-on or turn-off state. The second current I2 may flow to the second capacitor C2 and the gate electrode of the second NMOS transistor MN2 through the first PMOS transistor MP1 and the first NMOS transistor MN1. In this case, the second NMOS transistor MN2 may be turned on. However, in some cases, the magnitude of a leakage current Ileak1 may not be great enough to turn on the second NMOS transistor MN2.

A third current I3 being a portion of the ESD current may be a leakage current flowing through the first and second PMOS transistors MP1 and MP2 of a turn-off state and the second NMOS transistor MN2 of a turn-on or turn-off state. The third current I3 may flow to the third capacitor C3 and the gate electrode of the third NMOS transistor MN3 through the first PMOS transistor MP1, the second PMOS transistor MP2, and the second NMOS transistor MN2. sec FIG. 5 is a circuit diagram illustrating an operation of the ESD clamp circuit 100 of FIG. 3.

Figure 5:
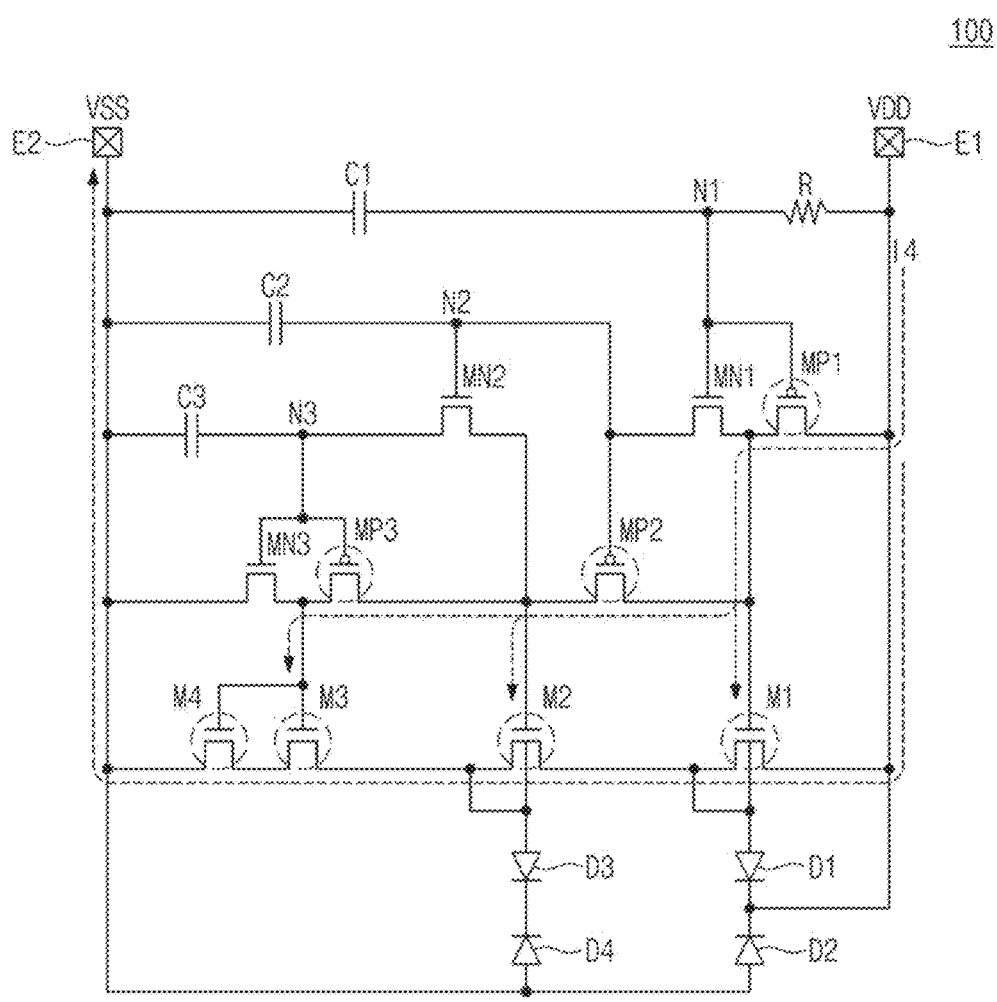
FIG. 5 is a circuit diagram illustrating an operation of an ESD clamp circuit of FIG. 3, according to an embodiment of the present disclosure.

Referring to FIGS. 4 and 5, when the ESD event occurs, the frequency of the ESD current (or voltage) input to the first electrode E1 may be very high. For example, the frequency of the ESD current may be several hundred MHz to several GHz, and the present disclosure is not limited thereto. That is, because the frequency of the ESD current is very high, the first capacitor C1, the second capacitor C2, and the third capacitor C3 may be regarded as being short-circuited due to the currents flowing to the first capacitor C1, the second capacitor C2, and the third capacitor C3. Accordingly, potentials of the first node N1, the second node N2, and the third node N3 may be set to the ground voltage VSS in a moment.

As the ground voltage VSS is applied to the first node N1, the second node N2, and the third node N3, the first PMOS transistor MP1, the second PMOS transistor MP2, and the third PMOS transistor MP3 may be turned on. In this case, a fourth current I4 being a portion of the ESD current may be input to the gate electrodes of the clamping transistors M1, M2, M3, and M4, and thus, the clamping transistors M1, M2, M3, and M4 may be turned on.

Accordingly, the first electrode E1, the first clamping transistor M1, the second clamping transistor M2, the third clamping transistor M3, the fourth clamping transistor M4, and the second electrode E2 may form a path for discharging the ESD current.

Meanwhile, the above operations described with reference to FIGS. 4 and 5 may be performed mostly simultaneously. That is, the above operations described with reference to FIGS. 4 and 5 are described as if they are artificially distinguished from each other for ease of description.

Figure 6:
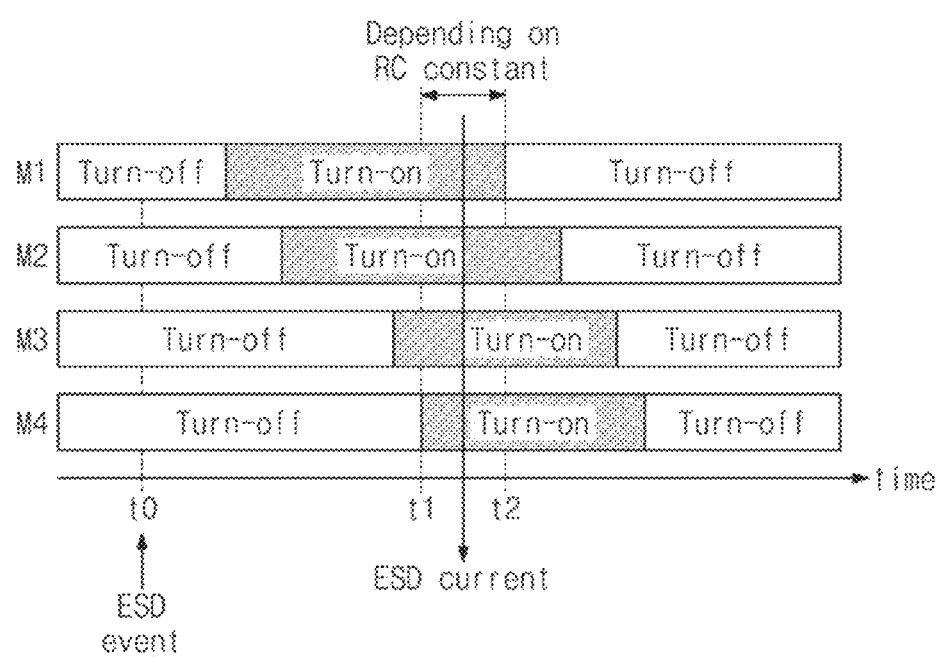
FIG. 6 is a diagram illustrating an operation of an ESD clamp circuit, according to an embodiment of the present disclosure.

FIG. 6 is a diagram illustrating an operation of an ESD clamp circuit according to an embodiment of the present disclosure.

Referring to FIGS. 4, 5, and 6, at the point in time t0, the ESD event may occur. When the ESD event occurs, the ESD current (or voltage) may be input to the first electrode E1. Afterwards, the clamping transistors may be turned on depending on the operation of the ESD clamp circuit 100 described with reference to FIGS. 4 and 5. An embodiment in which the first clamping transistor M1 to the fourth clamping transistor M4 are sequentially turned on is illustrated in FIG. 6, but the present disclosure is not limited thereto.

After the first clamping transistor M1 is turned on, at the point in time t1, all the clamping transistors M1 to M4 may be turned on. The clamping transistors M1 to M4 may be sequentially turned off from the point in time t2. That is, to form a path from the first electrode E1 to the second electrode E2, through which the ESD current is discharged, a time period (i.e., from t1 to t2) where all the clamping transistors M1 to M4 are turned on may be required.

In an embodiment, to implement the time period (i.e., from t1 to t2) where all the clamping transistors M1 to M4 are turned on, the test operation may be performed on the ESD clamp circuit 100 in advance. For example, to implement the time period (i.e., from t1 to t2) where all the clamping transistors M1 to M4 are turned on, there may be executed the simulation for adjusting sizes and channel widths of PMOS transistors and NMOS transistors constituting the ESD clamp circuit 100.

Additionally/Alternatively, to implement the time period (i.e., from t1 to t2) where all the clamping transistors M1 to M4 are turned on, there may be executed the simulation for adjusting values of the resistor "R" and the capacitors C1, C2, and C3 of the ESD clamp circuit 100. The adjustment of the values of the resistor "R" and the capacitors C1, C2, and C3 may be made to adjust the time constant (i.e., the RC time constant) of the ESD clamp circuit 100.

According to the ESD clamp circuit 100 described with reference to FIGS. 1 to 6, a path for discharging the ESD current may be stably secured by sequentially turning on clamping transistors of respective stacks (or stages) by using capacitors and inverters.

In addition, the ESD clamp circuit 100 of the present disclosure may not use a parasitic bipolar junction transistor (BJT), unlike the thyristor-based ESD protection circuit. Instead, the ESD clamp circuit 100 of the present disclosure discharges the ESD current by using a field effect transistor (FET). Accordingly, the snap-back phenomenon that occurs in the thyristor-based ESD protection circuit may not be caused in the ESD clamp circuit 100.

The level of the ESD voltage to be handled by the ESD clamp circuit 100 of the present disclosure may exceed about 1 V. The level of the ESD voltage handled by the thyristor-based ESD protection circuit may exceed several volts or tens volts. That is, the level of the ESD voltage to be handled by the ESD clamp circuit 100 of the present disclosure may be different from the level of the ESD voltage handled by the thyristor-based ESD protection circuit. Accordingly, the ESD clamp circuit 100 of the present disclosure may be appropriate for a processor or an application processor, which requires a low-power operation, not a PMIC.

Figure 7:
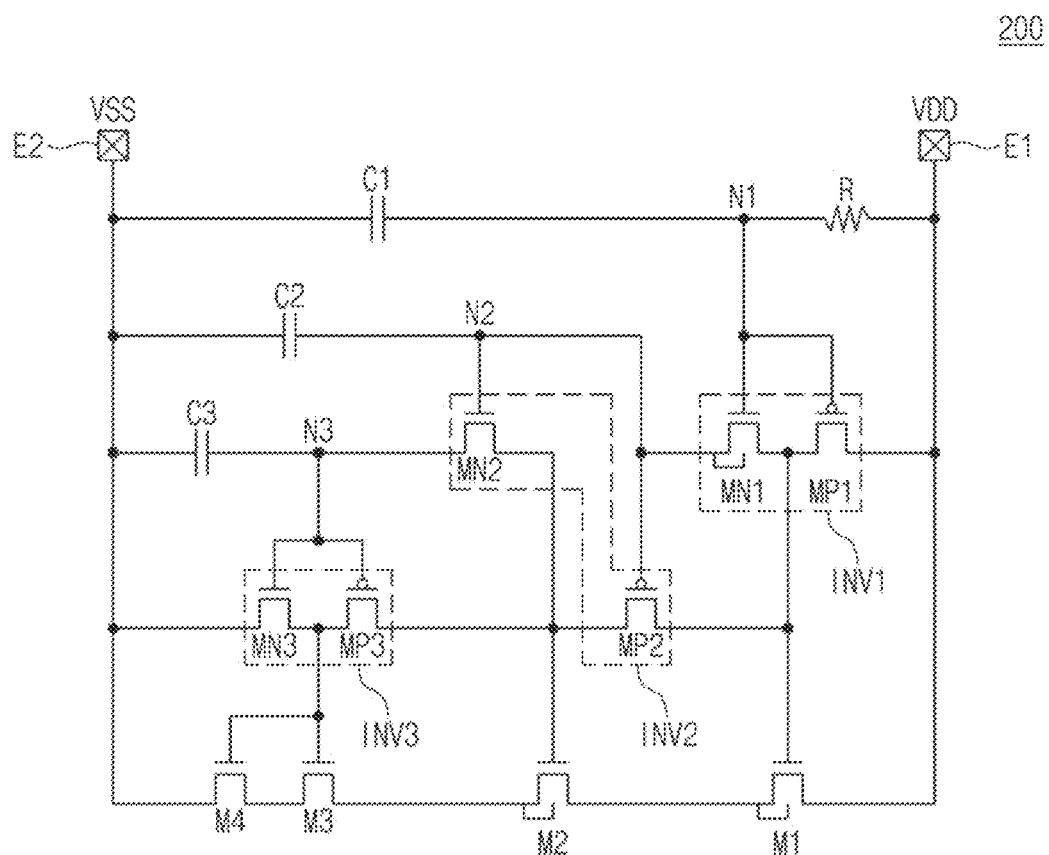
FIG. 7 is a diagram illustrating a configuration of an ESD clamp circuit, according to an embodiment of the present disclosure.

FIG. 7 is a diagram illustrating a configuration of an ESD clamp circuit 200 according to an embodiment of the present disclosure.

Because a transistor adjacent to the first electrode E1 to which the ESD current is introduced tolerates the ESD current of a relatively great value, an unintended current leakage may occur at the transistor (e.g., the first NMOS transistor MN1) adjacent to the first electrode E1. To reduce the leakage current, the ESD clamp circuit 200 may have a modified structure of the ESD clamp circuit 100 of FIG. 1.

In an embodiment, the configuration of the ESD clamp circuit 200 may be mostly identical to the configuration of the ESD clamp circuit 100 described with reference to FIGS. 1 to 6. However, the first NMOS transistor MN1 of the ESD clamp circuit 200 of FIG. 7 may be a transistor formed on at least one well, unlike the ESD clamp circuit 100 of FIGS. 1 to 6. For example, as in an embodiment of FIG. 2, the first NMOS transistor MN1 may be a transistor formed on a P-well formed on an N-well. The amount of current leaked out through the first NMOS transistor MN1 may decrease by forming a substrate, an N-well, and a P-well, which are doped with impurities to have different concentrations, and forming the first NMOS transistor MN1 on the P-well.

Figure 8:
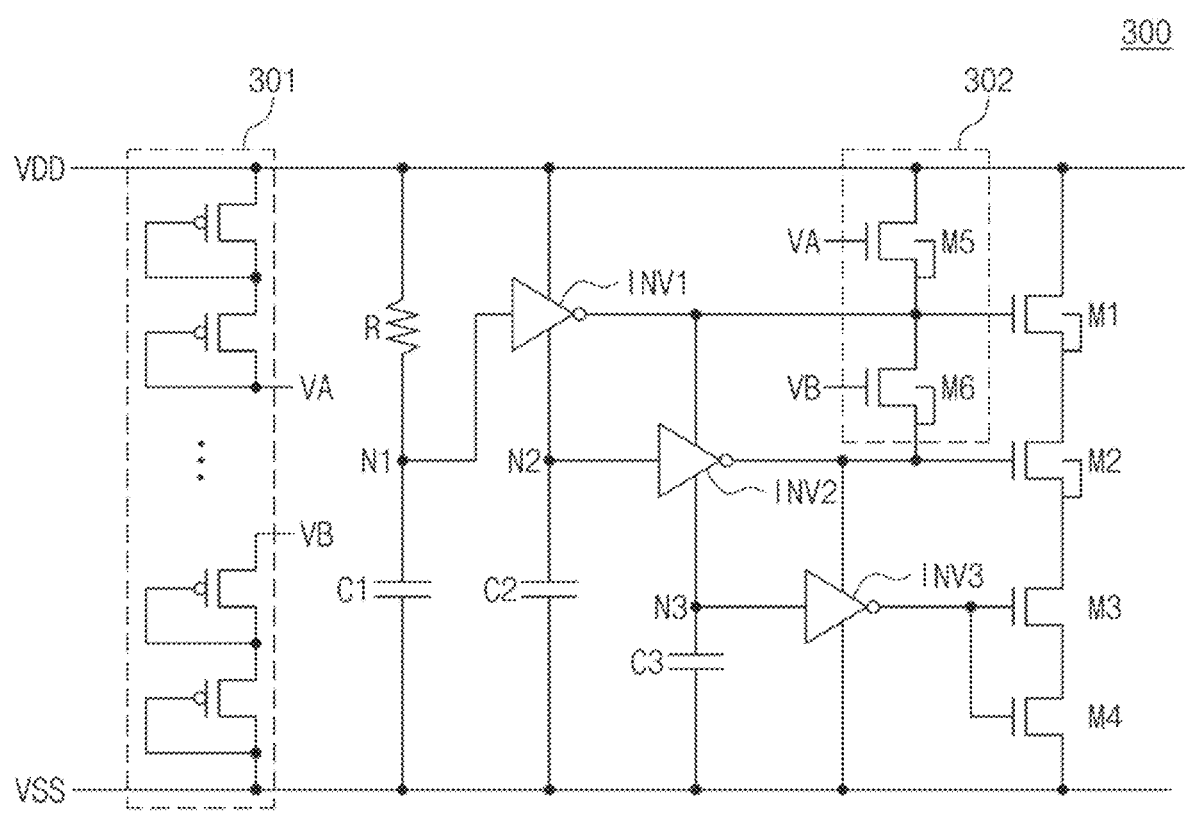
FIG. 8 is a diagram illustrating a configuration of an ESD clamp circuit, according to an embodiment of the present disclosure.

FIG. 8 is a diagram illustrating a configuration of an ESD clamp circuit 300 according to an embodiment of the present disclosure.

The configuration of the ESD clamp circuit 300 may be mostly identical to the configuration of the ESD clamp circuit 100 described with reference to FIG. 1. However, compared to the ESD clamp circuit 100 of FIG. 1, the ESD clamp circuit 300 may further include voltage division circuits 301 and 302.

The voltage division circuit 301 may include PMOS transistors connected in series between the node to which the power supply voltage VDD is provided and the node to which the ground voltage VSS is provided and may have a structure where the gate electrode and the drain electrode of each of the PMOS transistor are connected to each other. A voltage divider may be implemented by connecting the PMOS transistors, each of which includes the gate electrode and the drain electrode connected to each other, in series.

The voltage division circuit 302 may include NMOS transistors M5 and M6. The NMOS transistor M5 may be connected between the gate electrode and the drain electrode of the first clamping transistor M1, and the NMOS transistor M6 may be connected between the gate electrode of the first clamping transistor M1 and the gate electrode of the second clamping transistor M2.

In an embodiment, the NMOS transistors M5 and M6 constituting the voltage division circuit 302 may have the same structure of the clamping transistors M1 and M2. That is, a substrate, an N-well, and a P-well that are doped with impurities to have different concentrations may be formed, and the NMOS transistors M5 and M6 may be formed on the P-well. However, the present disclosure is not limited thereto. For example, as in the clamping transistors M3 and M4, the NMOS transistors M5 and M6 may be transistors formed on the substrate 110 (see, e.g., FIG. 1).

When the ESD current (or voltage) is input to the ESD clamp circuit 300 as the power supply voltage VDD, an output voltage VA may be obtained from the drain electrode of one of the PMOS transistors of the voltage division circuit 301, and an output voltage VB may be obtained from the source electrode of another thereof. The obtained output voltage VA may be input to the gate electrode of the NMOS transistor M5, and the obtained output voltage VB may be input to the gate electrode of the NMOS transistor M6. In this case, the NMOS transistors M5 and M6 may be turned on, and thus, the voltage division circuit 302 may play a role of the voltage divider. This may allow the output voltages of the first and second inverters INV1 and INV2 to be stably maintained. Accordingly, when the ESD events occurs, the clamping transistors M1 and M2 may be stably turned on.

Figure 9:
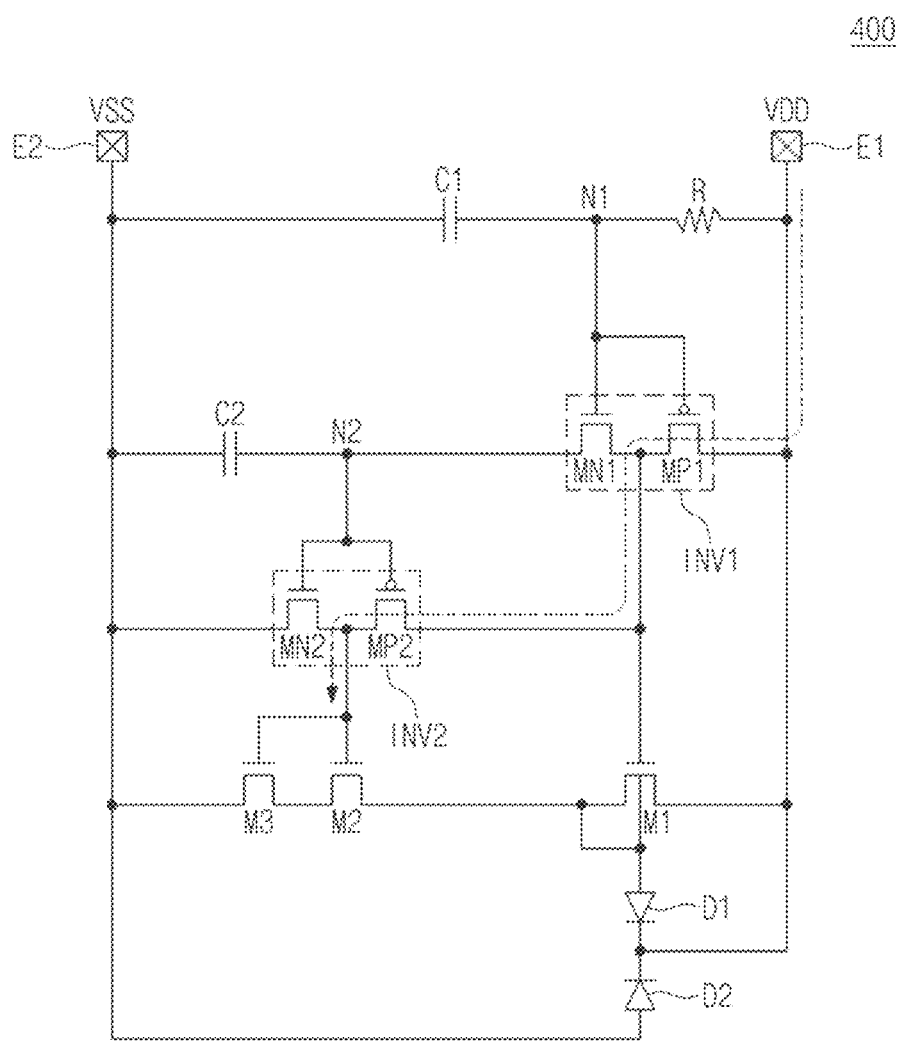
FIG. 9 is a diagram illustrating a configuration of an ESD clamp circuit, according to an embodiment of the present disclosure.

FIG. 9 is a diagram illustrating a configuration of an ESD clamp circuit 400 according to an embodiment of the present disclosure.

The ESD clamp circuit 400 may include the resistor "R", the first capacitor C1, the second capacitor C2, the first inverter INV1, the second inverter INV2, the first clamping transistor M1, the second clamping transistor M2, and the third clamping transistor M3. The first capacitor C1 and the second capacitor C2 may be actual capacitors, not parasitic capacitance components coming from the structure/configuration of transistors constituting the ESD clamp circuit 400.

The resistor "R" may be connected between the node to which the power supply voltage VDD is provided and the first node N1, and the first capacitor C1 may be connected between the node to which the ground voltage VSS is provided and the first node N1. The second capacitor C2 may be connected between the node to which the ground voltage VSS is provided and the second node N2.

Each of the first inverter INV1 and the second inverter INV2 may be a CMOS-based inverter. For example, the first inverter INV1 may include the first PMOS transistor MP1 and the first NMOS transistor MN1 and may output the power supply voltage VDD or the voltage of the second node N2 in response to the voltage of the first node N1. The second inverter INV2 may include the second PMOS transistor MP2 and the second NMOS transistor MN2 and may output the output voltage of the first inverter INV1 or the ground voltage VSS in response to the voltage of the second node N2.

The clamping transistors M1 to M3 may be connected in series between the node to which the power supply voltage VDD is provided and the node to which the ground voltage VSS is provided. The first clamping transistor M1 may operate in response to the output voltage of the first inverter INV1, and the second clamping transistor M2 and the third clamping transistor M3 may operate in response to the output voltage of the second inverter INV2.

In an embodiment, the clamping transistor M1 may be an NMOS transistor formed on at least two or more wells, and each of the clamping transistors M2 and M3 may be a transistor formed in a substrate. An embodiment in which two transistors (i.e., M2 and M3) operate in response to the output voltage of the second inverter INV2 is illustrated in FIG. 9, but the present disclosure is not limited thereto. That is, in various embodiments, the number of transistors operating in response to the output voltage of the second inverter INV2 may be 1 or may be 3 or more.

Because the operation of the ESD clamp circuit 400 of FIG. 9 is mostly identical to the operation of the ESD clamp circuit 100 described with reference to FIGS. 1 to 5, below, the description will be given briefly. When the ESD current (or voltage) is introduced to the first electrode E1 due to the occurrence of the ESD event, a portion of the ESD current flows to the first capacitor C1, and the remaining portion thereof flows to the second capacitor C2. It may be regarded that the capacitors C1 and C2 are electrically short-circuited due to the high frequency of the ESD current. In this case, as the potentials of the first node N1 and the second node N2 are set to the ground voltage VSS, the first PMOS transistor MP1 and the second PMOS transistor MP2 may be turned on due to the ground voltage VSS. According to the above bias condition, a current path passing through the first electrode E1, the first PMOS transistor MP1, and the second clamping transistor M2 may be formed, and the clamping transistors M1, M2, and M3 may be turned on. Accordingly, as a current path passing through the first electrode E1, the first clamping transistor M1, the second clamping transistor M2, the third clamping transistor M3, and the second electrode E2 is formed, the ESD current may be discharged.

Figure 10:
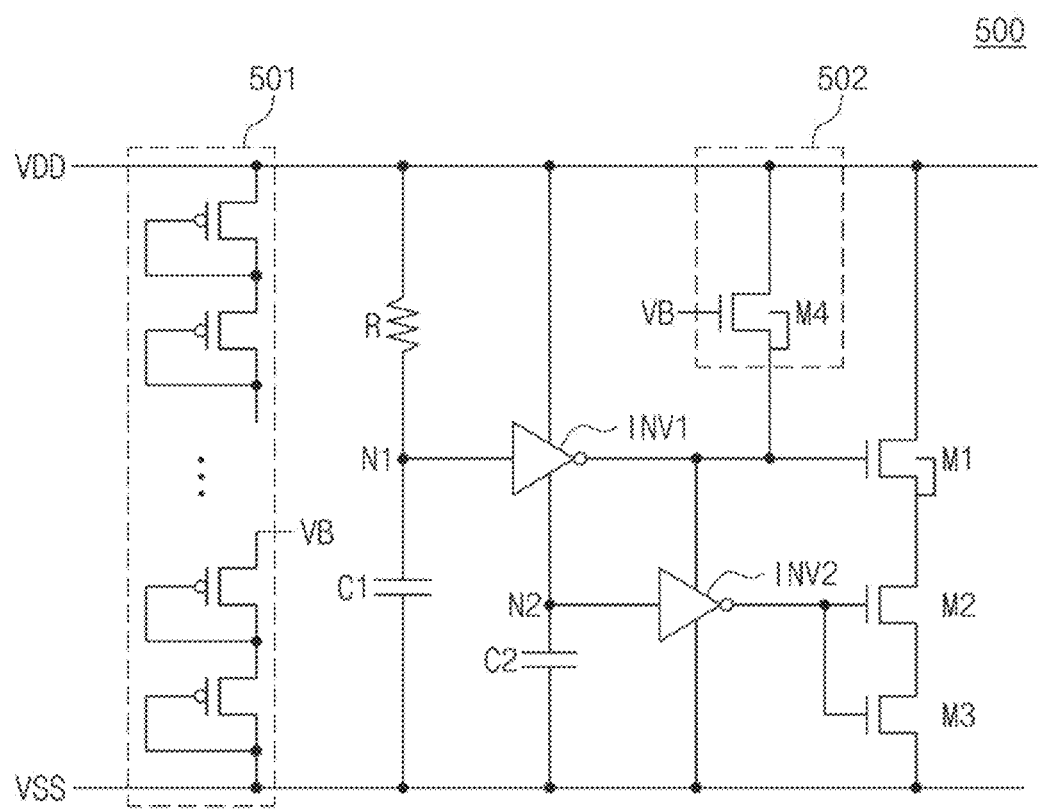
FIG. 10 is a diagram illustrating an operation of an ESD clamp circuit, according to an embodiment of the present disclosure.

FIG. 10 is a diagram illustrating a configuration of an ESD clamp circuit 500 according to an embodiment of the present disclosure.

The configuration of the ESD clamp circuit 500 may be mostly identical to the configuration of the ESD clamp circuit 400 of FIG. 9 except that the ESD clamp circuit 500 further includes voltage division circuits 501 and 502.

The voltage division circuit 501 may include PMOS transistors connected in series between the node to which the power supply voltage VDD is provided and the node to which the ground voltage VSS is provided and may have a structure where the gate electrode and the drain electrode of each of the PMOS transistor are connected to each other. A voltage divider may be implemented by connecting the PMOS transistors, each of which includes the gate electrode and the drain electrode connected to each other, in series.

The voltage division circuit 502 may include the NMOS transistor M4. The NMOS transistor M4 may be connected between the gate electrode and the drain electrode of the first clamping transistor M1. For example, the NMOS transistor M4 constituting the voltage division circuit 502 may have the same structure of the first clamping transistor M1. That is, a substrate, an N-well, and a P-well that are doped with impurities to have different concentrations may be formed, and the NMOS transistor M4 may be formed on the P-well. However, the present disclosure is not limited thereto. For example, as in the clamping transistors M2 and M3, the NMOS transistor M4 may be a transistor formed on the substrate 110 (see, e.g., FIG. 1).

The NMOS transistor M4 may operate in response to the output voltage VB obtained from the voltage division circuit 501. As the NMOS transistor M4 is turned on and the voltage division circuit 502 plays a role of the voltage divider, the output voltage of the first inverter INV1 may be stably maintained, and thus, the first clamping transistor M1 may be stably turned on when the ESD event occurs.

Figure 11:
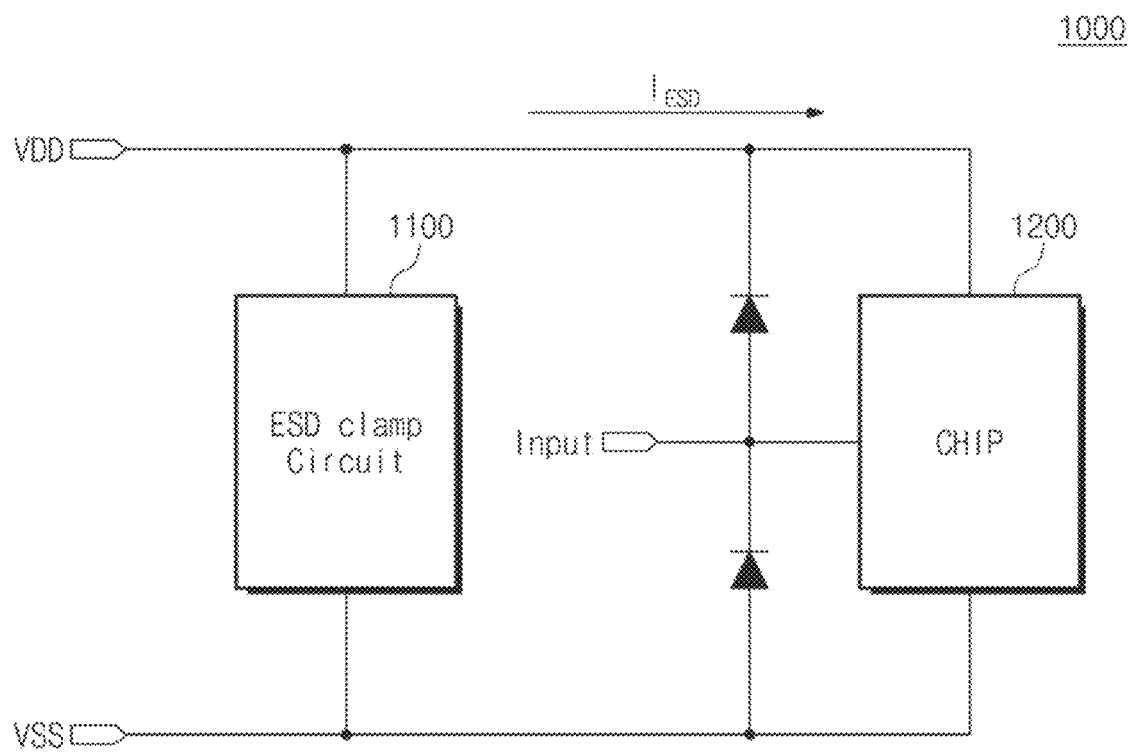
FIG. 11 is a diagram illustrating a configuration of an electronic device including an ESD clamp circuit, according to an embodiment of the present disclosure.

FIG. 11 is a diagram illustrating a configuration of an electronic device 1000 including an ESD clamp circuit 1100 of the present disclosure.

The electronic device 1000 may include the ESD clamp circuit 1100 and a semiconductor chip 1200. When the ESD clamp circuit 100 is powered on or operates, the power supply voltage VDD may be supplied to the semiconductor chip 1200. For example, the semiconductor chip 1200 may be a processor or an application processor that operates a small voltage of about 1 V. During the operation of the electronic device 1000, an ESD current $I_{ESD}$ may occur due to various factors. In this case, as the ESD clamp circuit 1100 operates, the ESD current $I_{ESD}$ may flow to an electrode, to which the ground voltage VSS is applied, through the ESD clamp circuit 1100.

Figure 12:
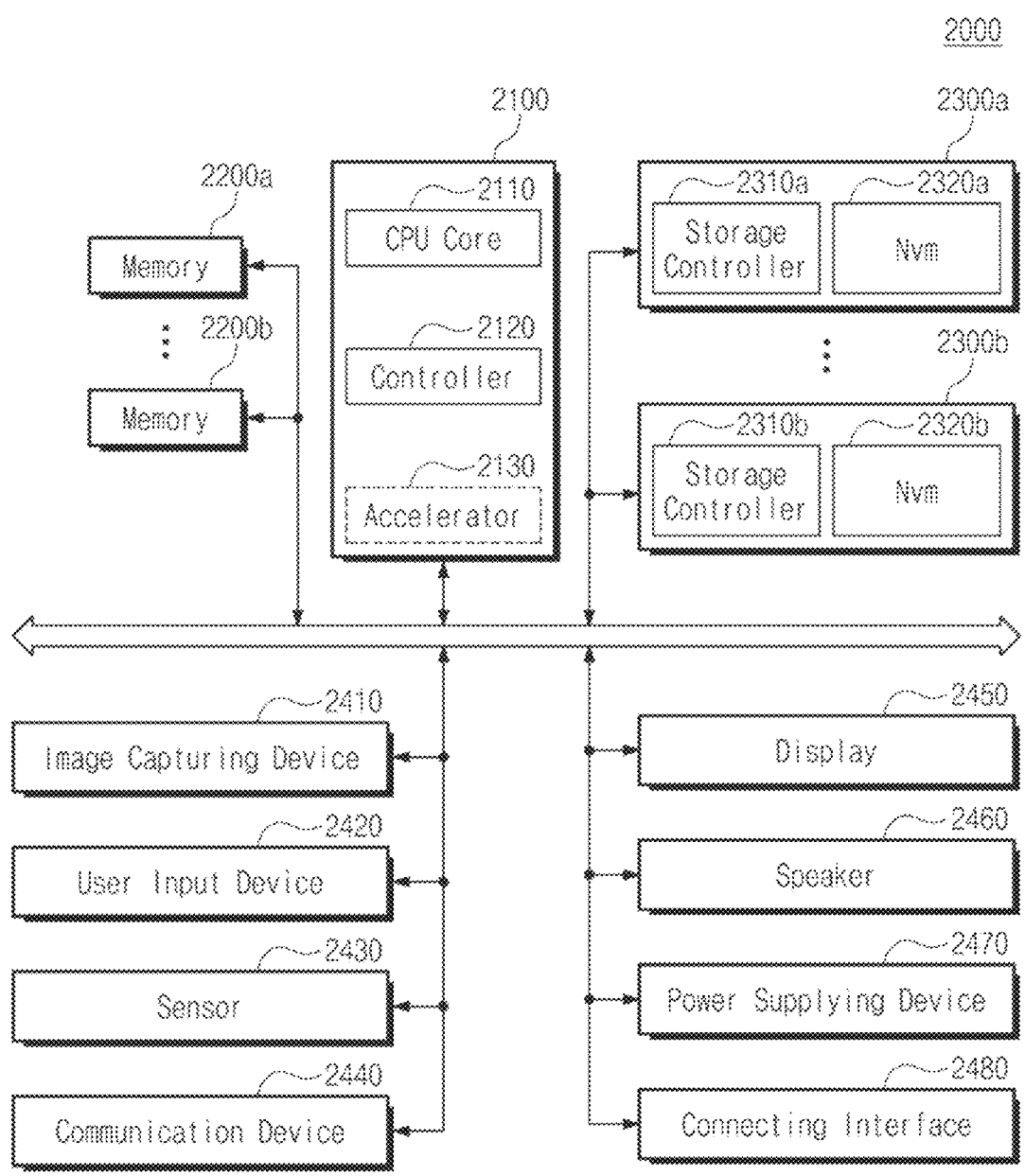
FIG. 12 is a diagram illustrating a configuration of a system including an ESD clamp circuit, according to an embodiment of the present disclosure.

FIG. 12 is a diagram of a system 2000 including an ESD clamp circuit 1100 of the present disclosure.

Referring to FIG. 12, the system 2000 may include a main processor 2100, memories (e.g., 2200a and 2200b), and storage devices (e.g., 2300a and 2300b). In addition, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2120 configured to control the memories 2200a and 2200b and/or the storage devices 2300a and 2300b. In some embodiments, the main processor 2100 may further include an accelerator 2130, which is a dedicated circuit for a high-speed data operation, such as an artificial intelligence (AI) data operation. The accelerator 2130 may include a graphics processing unit (GPU), a neural processing unit (NPU) and/or a data processing unit (DPU) and be implemented as a chip that is physically separate from the other components of the main processor 2100.

The memories 2200a and 2200b may be used as main memory devices of the system 2000. Although each of the memories 2200a and 2200b may include a volatile memory, such as static random access memory (SRAM) and/or dynamic RAM (DRAM), each of the memories 2200a and 2200b may include non-volatile memory, such as a flash memory, phase-change RAM (PRAM) and/or resistive RAM (RRAM). The memories 2200a and 2200b may be implemented in the same package as the main processor 2100.

The storage devices 2300a and 2300b may serve as non-volatile storage devices configured to store data regardless of whether power is supplied thereto, and have larger storage capacity than the memories 2200a and 2200b. The storage devices 2300a and 2300b may respectively include storage controllers (STRG CTRL) 2310a and 2310b and NVM (Non-Volatile Memory)s 2320a and 2320b configured to store data via the control of the storage controllers 2310a and 2310b. Although the NVMs 2320a and 2320b may include flash memories having a two-dimensional (2D) structure or a three-dimensional (3D) V-NAND structure, the NVMs 2320a and 2320b may include other types of NVMs, such as PRAM and/or RRAM.

The storage devices 2300a and 2300b may be physically separated from the main processor 2100 and included in the system 2000 or implemented in the same package as the main processor 2100. In addition, the storage devices 2300a and 2300b may have types of solid-state devices (SSDs) or memory cards and be removably combined with other components of the system 100 through an interface, such as the connecting interface 2480 that will be described below. The storage devices 2300a and 2300b may be devices to which a standard protocol, such as a universal flash storage (UFS), an embedded multi-media card (eMMC), or a non-volatile memory express (NVMe), is applied, without being limited thereto.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The display 2450 and the speaker 2460 may serve as output devices configured to respectively output visual information and auditory information to the user of the system 2000.

The power supplying device 2470 may appropriately convert power supplied from a battery embedded in the system 2000 and/or an external power source, and supply the converted power to each of components of the system 2000.

The connecting interface 2480 may provide connection between the system 2000 and an external device, which is connected to the system 2000 and capable of transmitting and receiving data to and from the system 2000. The connecting interface 2480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to the present disclosure, an electrostatic discharge clamp circuit capable of protecting an electronic device by using low-voltage FETs may be provided.

While one or more embodiments have been described with reference to embodiments thereof, it will be apparent to those of ordinary skill in the art that various changes and modifications may be made thereto without departing from the spirit and scope of the present disclosure as set forth in the following claims.

What is claimed is:

1. An electrostatic discharge clamp circuit comprising:
a resistor connected between a first node to which a power supply voltage is provided and a second node;
a first capacitor connected between the second node and a third node to which a ground voltage is provided;
a second capacitor connected between a fourth node and the third node to which the ground voltage is provided;
a third capacitor connected between a fifth node and the third node to which the ground voltage is provided;
a first inverter configured to provide the power supply voltage or a voltage of the fourth node based on a voltage of the second node;
a second inverter configured to provide an output voltage of the first inverter or a voltage of the fifth node based on the voltage of the fourth node;
a third inverter configured to provide an output voltage of the second inverter or the ground voltage based on the voltage of the fifth node; and
a first clamping transistor, a second clamping transistor, and a third clamping transistor connected in series between the first node to which the power supply voltage is provided and the third node to which the ground voltage is provided,
wherein the first clamping transistor is configured to operate based on the output voltage of the first inverter, the second clamping transistor is configured to operate based on the output voltage of the second inverter, and the third clamping transistor is configured to operate based on an output voltage of the third inverter.

2. The electrostatic discharge clamp circuit of claim 1, wherein the first clamping transistor is formed in a first double well that is formed on a substrate, and the second clamping transistor is formed in a second double well that is formed on the substrate.

3. The electrostatic discharge clamp circuit of claim 2, wherein the first double well includes a first well of a first conductivity that is formed on the substrate and a second well of a second conductivity that is formed on the first well, and
wherein the second double well includes a third well of the first conductivity that is formed on the substrate and a fourth well of the second conductivity that is formed on the third well.

4. The electrostatic discharge clamp circuit of claim 3, wherein the first clamping transistor includes a first diffusion region of the first conductivity, a second diffusion region of the first conductivity, and a first gate electrode, which are formed on the second well,
wherein the second clamping transistor includes a fourth diffusion region of the first conductivity, a fifth diffusion region of the first conductivity, and a second gate electrode, which are formed on the fourth well, and
wherein the second diffusion region, the fourth diffusion region, and a third diffusion region of the second conductivity formed on the first well are electrically connected.

5. The electrostatic discharge clamp circuit of claim 4, wherein the third clamping transistor includes a seventh diffusion region of the first conductivity, an eighth diffusion region of the first conductivity, and a third gate electrode, which are formed on the fourth well, and
wherein the fifth diffusion region, the seventh diffusion region, and a sixth diffusion region of the second conductivity formed on the fourth well are electrically connected.

6. The electrostatic discharge clamp circuit of claim 5, further comprising:
a fourth clamping transistor connected between the third clamping transistor and the third node to which the ground voltage is provided,
wherein the fourth clamping transistor is configured to operate based on the output voltage of the third inverter.

7. The electrostatic discharge clamp circuit of claim 6, wherein the fourth clamping transistor includes the eighth diffusion region, a ninth diffusion region of the first conductivity formed on the substrate, and a fourth gate electrode, and
wherein the ninth diffusion region is electrically connected to a tenth diffusion region of the second conductivity formed on the substrate.

8. The electrostatic discharge clamp circuit of claim 3, wherein the first conductivity is an N-type conductivity, and the second conductivity is a P-type conductivity.

9. The electrostatic discharge clamp circuit of claim 1, wherein each of the first inverter, the second inverter, and the third inverter is a CMOS-based inverter.

10. The electrostatic discharge clamp circuit of claim 1, further comprising:
a first plurality of transistors connected in series between the first node to which the power supply voltage is provided and the third node to which the ground voltage is provided;
a first transistor connected between a gate electrode and a drain electrode of the first clamping transistor; and
a second transistor connected between the gate electrode of the first clamping transistor and a gate electrode of the second clamping transistor,
wherein a gate electrode and a drain electrode of each of the first plurality of transistors are connected to each other,
wherein an output voltage of one of the first plurality of transistors is provided to a gate electrode of the first transistor, and
wherein an output voltage of another of the first plurality of transistors is provided to a gate electrode of the second transistor.

11. An electrostatic discharge clamp circuit comprising:
a resistor connected between a first node to which a power supply voltage is provided and a second node;
a first capacitor connected between the second node and a third node to which a ground voltage is provided;
a second capacitor connected between a fourth node and the third node to which the ground voltage is provided;
a first inverter configured to provide the power supply voltage or a voltage of the fourth node based on a voltage of the second node;
a second inverter configured to provide an output voltage of the first inverter or the ground voltage based on the voltage of the fourth node;
a first clamping transistor and a second clamping transistor connected in series between the first node to which the power supply voltage is provided and the third node to which the ground voltage is provided; and
a third clamping transistor connected between the second clamping transistor and the third node to which the ground voltage is provided, wherein the third clamping transistor is configured to operate based on the output voltage of the second inverter,
wherein the first clamping transistor is configured to operate based on the output voltage of the first inverter, and the second clamping transistor is configured to operate based on an output voltage of the second inverter.

12. The electrostatic discharge clamp circuit of claim 11, wherein the first clamping transistor is formed in a double well that is formed on a substrate, and
wherein the double well includes a first well of a first conductivity formed on the substrate and a second well of a second conductivity that is formed on the first well.

13. The electrostatic discharge clamp circuit of claim 12, wherein the first clamping transistor includes a first diffusion region of the first conductivity, a second diffusion region of the first conductivity, and a first gate electrode, which are formed on the second well.

14. The electrostatic discharge clamp circuit of claim 13, wherein the second clamping transistor includes a fourth diffusion region of the first conductivity, a fifth diffusion region of the first conductivity, and a second gate electrode, which are formed on the substrate, and
wherein the second diffusion region, the fourth diffusion region, and a third diffusion region of the second conductivity formed on the second well are electrically connected.

15. The electrostatic discharge clamp circuit of claim 12, wherein the first conductivity is an N-type conductivity, and the second conductivity is a P-type conductivity.

16. The electrostatic discharge clamp circuit of claim 11, wherein the third clamping transistor includes the fifth diffusion region, a sixth diffusion region of the first conductivity formed on the substrate, and a third gate electrode, and
wherein the sixth diffusion region is electrically connected to a seventh diffusion region of the second conductivity that is formed on the substrate.

17. An electrostatic discharge clamp circuit comprising:
a resistor and a first capacitor connected in series between a first node to which a power supply voltage is provided and a second node to which a ground voltage is provided;
a first PMOS transistor and a first NMOS transistor connected between the first node to which the power supply voltage is provided and a third node, and configured to operate based on a voltage of a fourth node between the resistor and the first capacitor;
a second capacitor connected between the third node and the second node to which the ground voltage is provided;
a second PMOS transistor and a second NMOS transistor connected between a fifth node between the first PMOS transistor and the first NMOS transistor and a sixth node, and configured to operate based on a voltage of the third node;
a third capacitor connected between the sixth node and the second node to which the ground voltage is provided;
a third PMOS transistor and a third NMOS transistor connected between a seventh node between the second PMOS transistor and the second NMOS transistor and the second node to which the ground voltage is provided, and configured to operate based on a voltage of the sixth node; and
a first clamping transistor, a second clamping transistor, and a third clamping transistor connected in series between the first node to which the power supply voltage is provided and the second node to which the ground voltage is provided,
wherein a gate electrode of the first clamping transistor is connected to the fifth node between the first PMOS transistor and the first NMOS transistor, a gate electrode of the second clamping transistor is connected to the seventh node between the second PMOS transistor and the second NMOS transistor, and a gate electrode of the third clamping transistor is connected to an eighth node between the third PMOS transistor and the third NMOS transistor.

18. The electrostatic discharge clamp circuit of claim 17, wherein the first clamping transistor is formed in a first double well that is formed on a substrate, the second clamping transistor is formed in a second double well that is formed on the substrate, and the third clamping transistor is formed on the substrate,
wherein the first double well includes a first well of a first conductivity that is formed on the substrate and a second well of a second conductivity that is formed on the first well, and wherein the second double well includes a third well of the first conductivity that is formed on the substrate and a fourth well of the second conductivity that is formed on the third well.

19. The electrostatic discharge clamp circuit of claim 18, wherein the first clamping transistor includes a first diffusion region of the first conductivity, a second diffusion region of the first conductivity, and a first gate electrode, which are formed on the second well, wherein the second clamping transistor includes a fourth diffusion region of the first conductivity, a fifth diffusion region of the first conductivity, and a second gate electrode, which are formed on the fourth well, wherein the third clamping transistor includes a seventh diffusion region of the first conductivity, an eighth diffusion region of the first conductivity, and a third gate electrode, which are formed on the fourth well, wherein the second diffusion region, the fourth diffusion region, and a third diffusion region of the second conductivity formed on the first well are electrically connected, and wherein the fifth diffusion region, the seventh diffusion region, and a sixth diffusion region of the second conductivity formed on the fourth well are electrically connected.

* * * * *